Patented Dec. 18, 1923.

1,477,757

UNITED STATES PATENT OFFICE.

WALTER J. HUGHES AND ABRAHAM S. BEHRMAN, OF CHICAGO, ILLINOIS, ASSIGNORS TO INTERNATIONAL FILTER CO., OF CHICAGO, ILLINOIS, A CORPORATION OF ILLINOIS.

ZEOLITE AND PROCESS OF PREPARING SAME.

No Drawing.   Application filed May 21, 1920. Serial No. 383,214.

*To all whom it may concern:*

Be it known that we, WALTER J. HUGHES and ABRAHAM S. BEHRMAN, citizens of the United States, residing at Chicago, in the county of Cook and State of Illinois, have invented certain new and useful Improvements in Zeolite and Processes of Preparing Same, of which the following is a specification.

This invention relates to zeolites and the like and process of making the same and particularly to a process for conditioning soils with natural base exchange properties or naturally adapted for acquiring these properties, in order that they may be applied to technical uses such as the softening of water.

It is already known that water may be softened by the use of base exchange silicates or zeolites, and that materials having base exchange properties occur in nature. It has been proposed to produce zeolites synthetically as well as to prepare the naturally occurring substances having potential base exchanging properties for technical use by chemical treatment.

The general practice in the case of preparing water softening materials from natural soils possessing base exchange properties, particularly those of a clayey nature, is to make, more or less directly, a heavy mud or mass of the substance. This mud or mass is worked into particles of the desired size and character, which are then dried and heated until they harden sufficiently to resist wear and other disintegrating influences ordinarily encountered in industrial use. In some cases the particles are heated to a temperature so high as to effect a melt or fusion. The material thus heated or burned is subsequently hydrated or rehydrated by heating in a solution of an alkali. Water containing in solution compounds of calcium and magnesium may be softened by passage through a bed of this material containing sodium (or potassium), the calcium and magnesium in the water being exchanged for the sodium. After the sodium content has been more or less exhausted, the material may be regenerated or revived for further use by contact with a solution of sodium chloride or other like salt, whereupon the calcium and magnesium taken up by the material are replaced by sodium, the calcium and magnesium going into solution in the form of chlorides.

We have found, in the case of clayey soils possessing or capable of acquiring base exchange properties, that if before burning, they are combined with an alkali, such as the carbonate or hydroxite of sodium or potassium, preferably the hydroxide, the temperature at which the material frits or hardens sufficiently to become suitable for industrial use is much lower than if treated according to the general practice heretofore outlined. and also that the capacity for absorbing bases in the exchange steps is appreciably increased. The object of the present invention is to provide a process which will incorporate this discovery and effect the advantages and savings incident thereto.

In practice the alkali may be employed as one of the constituents of the mud or mass of base exchanging material that is to be made into particles of the desired size and character. This mud or mass may be worked cold; that is, no heat is applied to aid the action of the alkali before the material is made into particles ready for drying and burning; or this mud or mass may be heated and brought to proper working consistency under steam pressure or otherwise; or the base exchanging substance, in a more or less finely divided condition, may be boiled at atmospheric pressure for a period in a solution of the alkali, after which the solids may be allowed to settle and the solution removed by decantation or filtration or both; or, the mixture of solid matter and solution may be boiled down or otherwise evaporated until a mud or mass of the proper working consistency is obtained. We have obtained the best results by the use of heat in mixing.

In order that the invention may be readily understood, the process and its product are set forth herein by way of a detailed description of one method of procedure. In carrying out the process, we proceed by way of exemplification, according to the following formula: Three pounds of caustic soda are dissolved in thirty litres of water and mixed with thirty pounds of a suitable clay by boiling and stirring. When the alkali has been effectually absorbed the solids are permitted to settle, after which the remaining liquid is removed. The mass is then dried sufficiently to permit of its being worked, when it is compacted, divided and thoroughly dried and screened in order to select particles of the size best adapted to present the greatest surface area in a filter bed and yet permit easy penetration of salt solutions in the base exchanging steps. These particles are then baked at a temperature of approximately 1000° F. for a period of about 45 minutes, as a result of which baking the particles become hardened and more or less dehydrated. To rehydrate, and to place them in condition for water softening action, the baked particles are heated in a 10% solution of caustic soda for 3 to 6 hours depending on the size of the particles.

We have been able by this treatment to produce a zeolite of the required hardness and stability at a temperature several hundred degrees (F.) lower than is required for the preparation of like materials not treated with an alkali solution prior to the baking step. This reduction in the temperature necessary to be employed effects substantial savings in the amount of fuel or current required, and materially lessens the wear and tear on the apparatus and machinery employed. Moreover, the zeolites prepared by the new treatment have appreciably greater capacity for exchanging bases than those prepared according to other formulæ as evidenced by the fact that a given quantity thereof will soften more water before regeneration is necessary than will a like quantity of zeolites prepared according to the processes heretofore prescribed.

While we have set forth in detail only one method of procedure it is to be understood that modifications, such as the manner of incorporating the alkali in the soils, reducing the mass to particles of the size desired, in the baking temperature, the method of rehydrating, and the selection of other forms of alkali, may be employed without departing from the scope of the invention as set forth in the appended claims.

We claim:

1. The process of preparing a base exchange material which comprises mixing alkali and clayey soil having or capable of acquiring base exchange properties and baking the mixture to harden the same.

2. The process of preparing a base exchange material which comprises mixing alkali and clayey soil having or capable of acquiring base exchange properties, baking the mixture to harden it and subsequently rehydrating the same.

3. The process of preparing a base exchange material which comprises mixing alkali and clayey soil having or capable of acquiring base exchange properties, baking the mixture to harden it and subsequently rehydrating the same with a solution of an alkali.

4. The process of preparing a base exchange material which comprises mixing alkali and clayey soil having or capable of acquiring base exchange properties, heating the mixture at a temperature of approximately 1000° F. and subsequently rehydrating.

5. The process of preparing a zeolite which comprises mixing alkali and a clayey soil having or capable of acquiring base exchange properties, heating the mixture at a temperature of approximately 1000° F. and subsequently rehydrating the same with a solution of an alkali.

6. The process of preparing a base exchange material which comprises mixing under the influence of heat alkali and clayey soil having or capable of acquiring base exchange properties, baking the mixture to harden the same and subsequently rehydrating.

7. The process of preparing a zeolite which comprises boiling a clayey soil having or capable of acquiring base exchange properties in a solution of an alkali, drying the mass, baking to harden the same, and then rehydrating.

8. The process of preparing a zeolite which comprises boiling a clayey soil having or capable of acquiring base exchange properties in a solution of an alkali, reducing the mass to uniformly compacted particles to harden the same, drying and baking the particles and subsequently rehydrating.

9. The process of preparing a zeolite which comprises mixing a clayey soil having or capable of acquiring base exchange properties with sufficient solution containing an alkali to obtain a workable consistency, reducing the mass to uniformly compacted particles, heating the particles to a temperature of approximately 1000° F. for a period of about 45 minutes, and then rehydrating.

10. The process of preparing a zeolite which comprises mixing a clayey soil having or capable of acquiring base exchange properties with sufficient solution containing an alkali to obtain a workable consistency, reducing the mass to uniformly compacted particles, heating the particles at a temperature of approximately 1000° F. for a period of about 45 minutes, and then rehydrating in a solution of an alkali.

11. The process of preparing a zeolite which comprises mixing a clayey soil having or capable of acquiring base exchange properties in a solution of an alkali, drying and dividing the mass into particles of a size adapted for filtering media, baking the particles to harden them and subsequently heating the same in a solution of an alkali.

12. The process of preparing a zeolite which comprises mixing a clayey soil having or capable of acquiring base exchange properties in a solution of caustic soda, drying and dividing the mass into particles best adapted for filtering media, baking the particles at a temperature of approximately 1000° F. and subsequently heating the same in a solution of an alkali.

13. A material for treatment of liquids comprising a baked mixture of alkali and clayey soil having or capable of acquiring base exchange properties.

14. A reagent material comprising a baked and rehydrated mixture of alkali and clayey soil having or capable of acquiring base exchange properties.

In testimony whereof we have hereunto signed our names in the presence of two subscribing witnesses.

WALTER J. HUGHES.
ABRAHAM S. BEHRMAN.

Witnesses:
J. A. WHITTINGTON,
WALTER H. GREEN.